(12) United States Patent
Aoyama et al.

(10) Patent No.: US 12,370,619 B2
(45) Date of Patent: Jul. 29, 2025

(54) ELECTRICAL RESISTANCE WELDING ELECTRODE

(71) Applicant: Shoji Aoyama, Osaka (JP)

(72) Inventors: Shoji Aoyama, Osaka (JP); Yoshitaka Aoyama, Osaka (JP)

(73) Assignee: Shoji Aoyama, Osaka (JP)

( * ) Notice: Subject to any disclaimer, the term of this patent is extended or adjusted under 35 U.S.C. 154(b) by 658 days.

(21) Appl. No.: 17/791,112

(22) PCT Filed: Jan. 25, 2021

(86) PCT No.: PCT/JP2021/002508
§ 371 (c)(1),
(2) Date: Jul. 6, 2022

(87) PCT Pub. No.: WO2021/171864
PCT Pub. Date: Sep. 2, 2021

(65) Prior Publication Data
US 2023/0035745 A1 Feb. 2, 2023

(30) Foreign Application Priority Data

Feb. 25, 2020 (JP) .................................. 2020-044730

(51) Int. Cl.
*B23K 11/30* (2006.01)
*B29C 45/14* (2006.01)

(52) U.S. Cl.
CPC .......... *B23K 11/3018* (2013.01); *B29C 45/14* (2013.01)

(58) Field of Classification Search
CPC .. B23K 11/3018; B23K 26/082; B23K 26/32; B23K 26/24; B23K 26/28; B23K 26/703; B23K 26/22; B23K 26/0622; B23K 2101/18; B23K 2101/006; B23K 26/323; B23K 26/044; B23K 2203/04; B23K 26/26; B23K 26/244; B23K 26/14; B23K 31/125; B23K 26/20; B23K 26/0066; B23K 26/0626; B23K 26/073; B23K 26/38; B23K 26/0619; B23K 26/0624; B23K 26/53;
(Continued)

(56) References Cited

FOREIGN PATENT DOCUMENTS

| JP | 2015-51457 | 3/2015 |
|----|------------|--------|
| JP | 2017-6982  | 1/2017 |

(Continued)

OTHER PUBLICATIONS

International Search Report issued Mar. 30, 2021 in corresponding International Application No. PCT/JP2021/002508.
(Continued)

*Primary Examiner* — Phuong T Nguyen
(74) *Attorney, Agent, or Firm* — Wenderoth, Lind & Ponack, L.L.P.

(57) ABSTRACT

A guide pin made of a heat-resistant hard material and a sliding member made of an insulating synthetic resin material are integrated. An inserted portion and an extended portion are provided in the sliding member. The thickness of the extended portion is set to be thinner than the thickness of the inserted portion. An air passage is formed in the extended portion thereby forming a thin-wall deformable portion. The surface of the thin-wall deformable portion is configured to bulge toward the air passage side when the extended portion is thermally expanded.

1 Claim, 5 Drawing Sheets

(58) Field of Classification Search
CPC ............ B23K 26/0006; B23K 26/0676; B23K 26/0861; B23K 2103/56; B23K 2101/40; B29C 45/14
USPC ......... 219/121.63, 121.64, 121.72, 136, 119, 219/120
See application file for complete search history.

(56) References Cited

FOREIGN PATENT DOCUMENTS

| | | | |
|---|---|---|---|
| JP | 2017-30048 | | 2/2017 |
| JP | 2017-30048 A | * | 2/2017 |
| JP | 2017-217696 | | 12/2017 |
| JP | 2019-217548 | | 12/2019 |

OTHER PUBLICATIONS

International Preliminary Report on Patentability and Written Opinion of the International Searching Authority issued Aug. 30, 2022 in corresponding International (PCT) Patent Application No. PCT/JP2021/002508.

* cited by examiner

ELECTRICAL RESISTANCE WELDING ELECTRODE

TECHNICAL FIELD

The present invention relates to an electrical resistance welding electrode in which a member obtained by integrating a guide pin made of a heat-resistant hard material such as a metal material or a ceramic material and a sliding member made of an insulating synthetic resin material is slidably incorporated in an electrode main body.

BACKGROUND ART

The electrical resistance welding electrode described in JP 2017-217696 A is designed by the applicant of the present application. In this welding electrode, a guide pin made of metal and having a circular section and a sliding member made of synthetic resin and having a circular section are integrated by injection molding, and a portion of the sliding member is slidably fitted in a guide hole of an electrode main body.

CITATIONS LIST

Patent Literature

Patent Literature 1: JP 2017-217696 A

SUMMARY OF INVENTION

Technical Problems

In the configuration described in Patent Literature 1, the guide pin and the sliding member are integrated by so-called insert molding in which a synthetic resin material is injected into a mold and the guide pin is subjected to enveloped casting. In such insert molding, the wall thickness of the synthetic resin in an inserted portion is set to be thick in order to maintain the coupling rigidity between the guide pin and the sliding member at a predetermined value.

In the subsequent studies, the following problems have been discovered. In the case where the guide pin and the sliding member are integrated by injection molding, the thickness as described above is uniformly maintained over the entire length of the sliding member. Thus, when the sliding member is heated and expanded, the amount of expansion increases so that the sliding member is strongly pressed over the entire length thereof against the inner face of a guide hole of the electrode main body. When the sliding member slides in such a state of an increased amount of expansion, the sliding wear amount increases. Thereafter, when the sliding member returns to ordinary temperature or the temperature of the sliding member decreases due to a decrease in the number of times of welding, the gap between the sliding member and the guide hole becomes excessive. Since such excessive gap is generated over the entire region of the sliding member, the inclination of the sliding member and the guide pin with respect to the central axial line of the electrode becomes great, and therefore a large deviation is generated in the relative position between a steel plate part and the electrode. This is disadvantageous for improving the welding accuracy.

The present invention has been provided to solve the above problems, and an object of the present invention is, in a configuration in which a guide pin made of metal and having a circular section and a sliding member made of synthetic resin and having a circular section are integrated by injection molding, to reduce a wear amount of the sliding member, thereby reducing an inclination angle of the guide pin.

Solutions to Problems

According to one aspect of the present invention, there is provided an electrical resistance welding electrode comprising:

- a guide pin having a circular section, protruding from an end face of a main body of the electrical resistance welding electrode, and passing through a pilot hole of a steel plate part, the guide pin being made of a heat-resistant hard material such as a metal material or a ceramic material;
- a sliding member having a circular section and slidably fitted in a guide hole of the main body of the electrical resistance welding electrode, the sliding member being made of an insulating synthetic resin material, wherein
- the guide pin and the sliding member are integrated with each other by insert molding during injection molding of the sliding member,
- the sliding member includes an inserted portion into which the guide pin is inserted, an extended portion that has a cylindrical shape and is continuous with the inserted portion, and a heat insulating portion that is formed at a boundary portion between the inserted portion and the extended portion and with which an end face of the guide pin is in close contact,
- a finely projected and recessed portion is formed on a surface of the guide pin to be inserted into the sliding member,
- a thickness of the extended portion as viewed in a diameter direction of the guide pin is set to be thinner than a thickness of the inserted portion,
- an air passage of cooling air flowing into the guide hole from a vent hole of the main body of the electrical resistance welding electrode is configured by forming a flat portion on an outer peripheral face of the sliding member.
- a thin-wall deformable portion is formed in the extended portion by forming the air passage of the cooling air, and wherein
- a sliding wear amount in the extended portion smaller than a sliding wear amount in the inserted portion is ensured by configuring such that, when the extended portion is heated, a surface of the thin-walled deformation portion bulges toward an inside of the air passage due to an expansion force in a circumferential direction of a non-thin-wall deformable portion in which the thin-wall deformable portion is not formed, acting on both sides of the thin-wall deformable portion, thereby setting a pressing force on an inner face of the guide hole in the extended portion during thermal expansion to be smaller than a pressing force on the inner face of the guide hole in the inserted portion during thermal expansion.

Advantageous Effects of Invention

Melting heat generated during welding of a part to the steel plate part by electrical resistance welding is transferred from the steel plate part to the sliding member through the electrode main body. At the same time, this melting heat is transferred from the guide pin to the sliding member. The heat transfer to the sliding member extends from the inserted portion into which the guide pin is inserted to the extended portion that has a cylindrical shape and is continuous with the inserted portion. As for the temperature distribution viewed in the central axial line direction of the electrode, the temperature in the inserted portion is higher than in the extended portion because the inserted portion is close to the molten portion.

In the inserted portion, the guide pin exists on the center side, and therefore force in the diameter direction in the inserted portion during thermal expansion strongly acts on the inner face of the guide hole. Furthermore, since the expansion of the guide pin itself is added, the pressing force acting on the inner face of the guide hole increases. Further, the inserted portion receives heat also from the guide pin.

Due to the heating phenomenon as described above, the difference in temperature between at the time of use of the electrode and at the time of non-use of the electrode increases in the inserted portion, and the amount of expansion or contraction of the inserted portion also increases. The wear amount of the inserted portion in such an environment is large.

The extended portion has a cylindrical shape, and the inside thereof is a space. In addition, since the heat insulating portion that is formed at a boundary portion between the inserted portion and the extended portion and with which the end face of the guide pin is in close contact is disposed, the amount of heat transferred to the extended portion is smaller than the amount of heat transferred to the inserted portion.

In the welding electrode of the present invention, the thickness of the extended portion as viewed in the diameter direction of the guide pin is molded to be thinner than the thickness of the inserted portion. In addition to such a thin extended portion, a flat portion for an air passage is provided in the sliding member, and a thin-wall deformable portion is formed in the extended portion. Therefore, when the extended portion is heated, the expansion force in the circumferential direction of the non-thin-wall deformable portion in which the thin-wall deformable portion is not formed acts from both sides of the thin-wall deformable portion, and the surface of the thin-wall deformable portion bulges toward the inside of the air passage. As a result, the pressing force acting on the inner face of the guide hole in the extended portion during thermal expansion is smaller than the pressing force acting on the inner face of the guide hole in the inserted portion during thermal expansion. Therefore, the sliding wear amount in the extended portion is significantly smaller than the sliding wear amount in the inserted portion.

When the extended portion expands, force acting in the diameter direction in the non-thin-wall deformable portion acts on the inner face of the guide hole. Such a force component is converted into an expansion force in the circumferential direction of the non-thin-wall deformable portion. The expansion force in the circumferential direction of the non-thin-wall deformable portion acts from both sides of the thin-wall deformable portion, whereby the surface of the thin-wall deformable portion deforms in the state where the surface of the thin-wall deformable portion bulges toward the space of the air passage. The force pressing the extended portion against the inner face of the guide hole by the thermal expansion is distributed due to the bulging deformation of the thin-wall deformable portion toward the air passage, and thus is significantly smaller than that of the inserted portion.

From the phenomenon described above, even if the wear progresses in the inserted portion, the wear amount in the extended portion is very small, or substantially zero. Even if the sliding member contracts resulting from returning of the sliding member to ordinary temperature due to operation shutdown or from lowering of the temperature due to reduction of the number of times of welding, the gap between the inserted portion and the guide hole is large, but the gap between the extended portion and the guide hole is very small or substantially absent.

Therefore, wear over the entire region of the sliding member is prevented from proceeding, normal sliding in the extended portion is maintained, and abnormally large inclination of the guide pin is prevented. That is, such an inexpedience in the welding electrode described in Patent Literature 1 that the entire region of the sliding member is significantly worn to an abnormal degree and a large gap is formed between the entire sliding member and the guide hole at ordinary temperature or when the number of times of welding is prevented, so that the sliding member and the guide pin can be prevented from being inclined greatly. Since the normal sliding in the extended portion is maintained as described above, the inclination of the sliding member and the guide pin decreases. In this way, the positional deviation of the guide pin in the inclination direction is reduced. Thus, the deviation of the relative position between the guide pin and the steel plate part falls within the allowable range, which is effective for improving the welding quality.

As described above, the amount of thermal expansion and contraction of the inserted portion appears large. However, since the synthetic resin material bites into the finely projected and recessed portion, the integrity of the guide pin and the synthetic resin material in the inserted portion can be reliably maintained.

The present invention is the invention of the welding electrode as described above, but as is apparent from the following embodiment, the present invention also has an aspect as an invention of method in which a thermal change or the like of a local sliding member is specified.

DESCRIPTION OF EMBODIMENT

Figure 1:
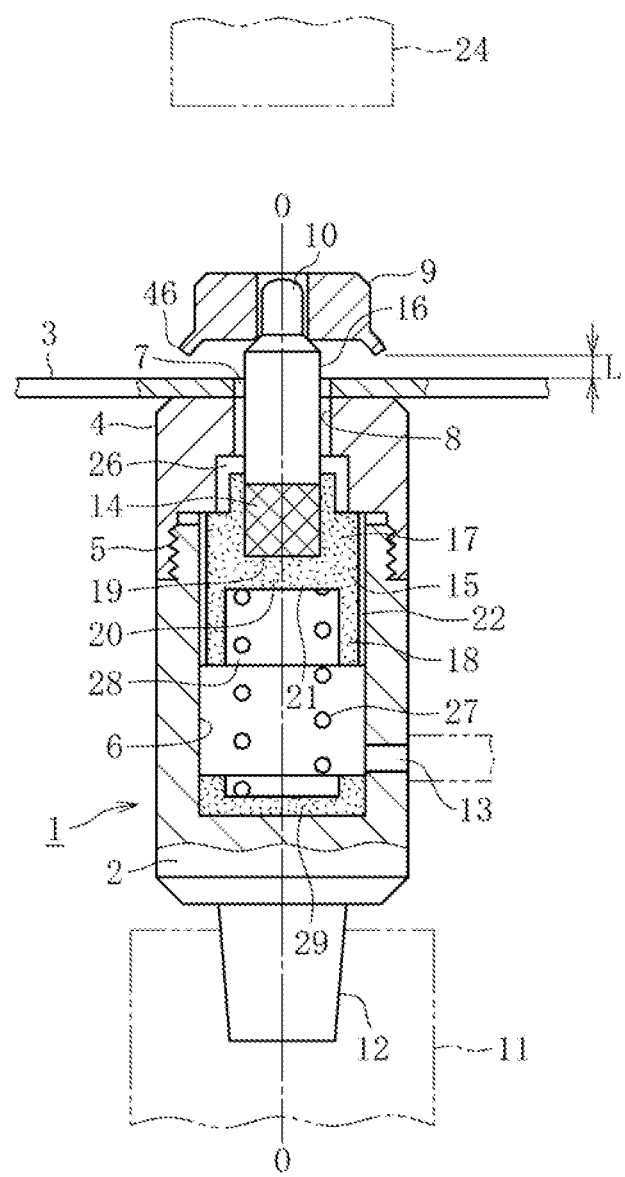
FIG. 1 is a sectional view of an entire electrode.
Figure 2:
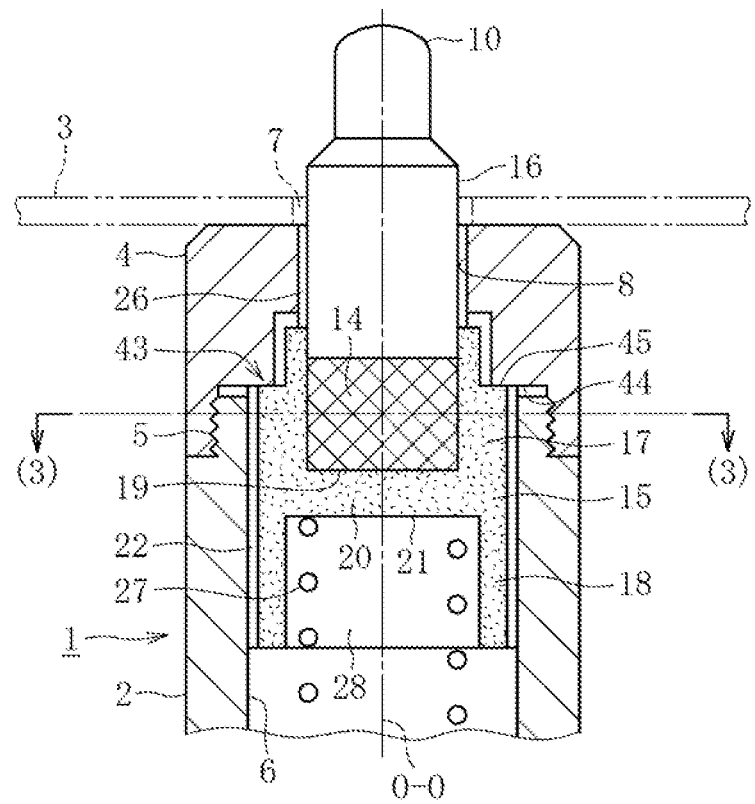
FIG. 2 is a sectional view of main parts of the electrode.

Next, an embodiment of an electrical resistance welding electrode according to the present invention will be described.

Embodiment

FIG. 1 to FIG. 9 illustrate an embodiment of the present invention.

First, the electrode main body will be described.

An electrode main body 1 made of a copper alloy has a cylindrical shape, and a fixed portion 2 to be inserted into a stationary member 11 and a cap 4 on which a steel plate part 3 is placed are joined together at a threaded portion 5. A central axial line of the electrode main body 1 is denoted by reference sign O-O. A guide hole 6 having a circular section is formed in the electrode main body 1.

A tapered portion 12 is formed below the fixed portion 2, and the tapered portion 12 is fitted into a tapered hole provided in the stationary member 11. A vent hole 13 for introducing compressed air for cooling into the guide hole 6 is provided in the side portion of the fixed portion 2.

The electrode main body 1 is a fixed electrode, and a movable electrode corresponding thereto is denoted by reference numeral 24.

Next, the sliding member will be described.

A sliding member 15 includes an inserted portion 17 into which a guide pin 16 is inserted, an extended portion 18 that has a cylindrical shape and is continuous with the inserted portion 17, and a heat insulating portion 20 that is formed at a boundary portion between the inserted portion 17 and the extended portion 18 and with which an end face 19 of the guide pin 16 is in close contact.

The guide pin 16 is made of a heat-resistant hard material such as a metal material, e.g., stainless steel, or a ceramic material. The sliding member 15 is made of an insulating synthetic resin having excellent heat resistance, for example, a polyphenylene sulfide (PPS) resin suitable for injection molding. The guide pin 16 is inserted into the sliding member 15 when the sliding member 15 is molded by injection molding.

The guide pin 16 and the sliding member 15 both have a circular section. The guide pin 16 passes through a through hole 8 provided in the cap 4 and a pilot hole 7 of the steel plate part 3 to perform a positioning function of the steel plate part 3, and supports a projection nut 9 made of iron and fitted to the front-end portion of the guide pin 16. Therefore, a minor diameter portion 10 that matches the screw hole of the projection nut 9 is formed.

In the following description, the projection nut may be simply referred to as a nut.

Figure 6:
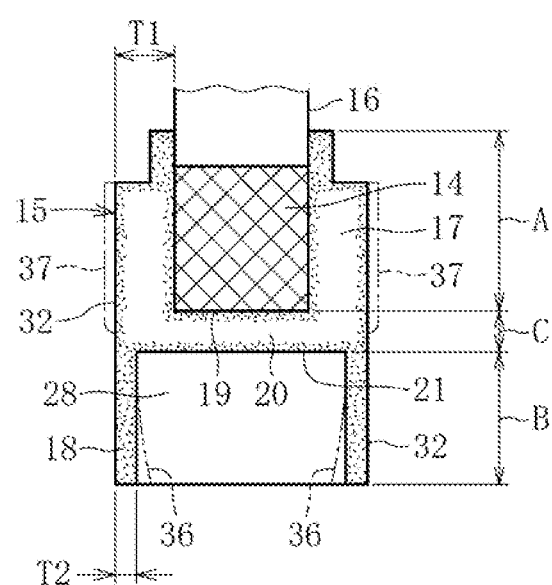
FIG. 6 is a partial sectional view illustrating expansion and deformation of a sliding member.
Figure 7:
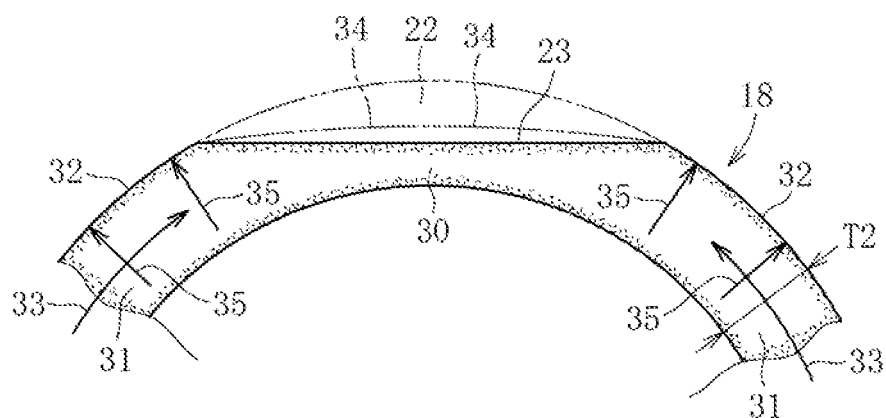
FIG. 7 is an enlarged sectional view illustrating a deformation state of a thin-wall deformable portion.

As illustrated in FIG. 6, the inserted portion 17 is a portion of the sliding member 15 corresponding to a section A from the upper end of the sliding member 15 to the lower end of the guide pin 16. The extended portion 18 is a cylindrical portion continuous with the inserted portion 17, and is a portion of the sliding member 15 corresponding to a section B from the lower end face of the heat insulating portion 20 to be described later to the lower end of the extended portion 18. The heat insulating portion 20 is a portion of the sliding member 15 corresponding to a section C from the lower end of the guide pin 16, that is, the end face 19 to a ceiling face 21 of the extended portion 18. The heat insulating portion 20 corresponds to a bottom member of the inserted portion 17.

A composite structure is formed in which the guide pin 16 is integrated in a state of being inserted into the sliding member 15. This integration is performed when the sliding member 15 is molded by injection molding. The guide pin 16 is held in a state of protruding into the mold cavity of the injection molding machine, and a molten synthetic resin is injected into the mold cavity, so that the guide pin 16 is inserted. That is, the above is insert molding which has been generally employed. This synthetic resin is the above-described polyphenylene sulfide (PPS) resin.

In order to further strengthen the integrity between the cast guide pin 16 and the sliding member 15, a finely projected and recessed portion 14 is formed on the surface of the guide pin 16 inserted into the sliding member 15. The projected and recessed portion 14 can be obtained by applying chemical treatment or plastic deformation to the surface of the guide pin 16.

Figure 4:
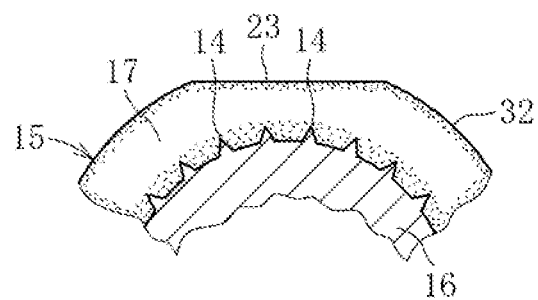
FIG. 4 is a sectional view illustrating a boundary portion between the guide pin and a projected and recessed portion.
Figure 5:
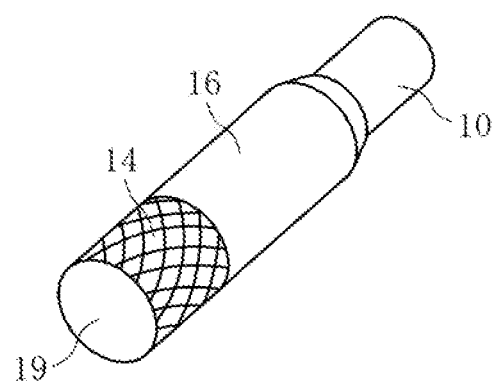
FIG. 5 is a perspective view of the single guide pin.

This embodiment employs the latter, i.e., plastic deformation, and specifically, knurling. Fine projections and recesses are formed on the surface of the rotary mold, and pressed against the surface of the guide pin 16 to rotate, whereby a projection-and-recess shape can be obtained due to plastic deformation. As illustrated in FIG. 5 and other drawings, this projection-and-recess shape is formed on the surface of the guide pin 16 in a state where grooves parallel in the inclined direction and other grooves parallel in the inclined direction are crossed each other, and has a rough feel when touched by hand. When the injection molding is completed, as illustrated in FIG. 4, the synthetic resin spreads all over the projections and the recesses of the projection-and-recess portion to integrate the guide pin 16 and the sliding member 15.

When the guide pin 16 is set in the mold, the projected and recessed portion 14 is exposed to the mold cavity, whereby the projected and recessed portion 14 is inserted with the synthetic resin.

The sliding member 15 is slidably fitted into the guide hole 6 with substantially no gap. An air passage 22 is formed in order to circulate the cooling air having entered from the vent hole 13 along the sliding member 15. The air passage 22 is formed in the central axial line O-O direction by forming a flat portion 23 on the outer peripheral face of the sliding member 15. A mold shape corresponding to the flat portion 23 is defined, and the flat portion 23 is obtained by die molding at the time of injection molding.

Figure 3:
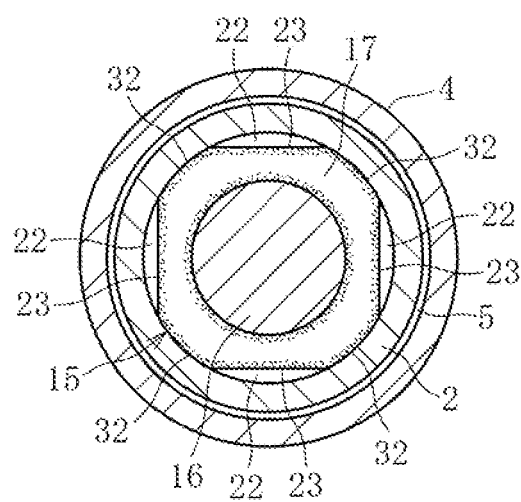
FIG. 3 is a sectional view taken along line (3)-(3) of FIG. 2.

As illustrated in FIG. 3, since the air passages 22 are formed at four positions of the sliding member 15, cylindrical faces 32 are retained at four positions other than the air passages 22, and slide on the inner face of the guide hole 6 with substantially no gap. The sliding member 15 performs an insulating function such that, when the movable electrode 24 advances and a welding current is applied, the current flows only from a welding projection 46 of the nut 9 to the steel plate part 3.

At a position where the guide pin 16 passes through the through hole 8, a void 26 is formed between the through hole 8 and the guide pin 16 to form an air passage for cooling air.

The guide pin 16 is integrated with the sliding member 15 in a state of being inserted into the sliding member 15, passes through the through hole 8 and the pilot hole 7, protrudes beyond the steel plate part 3, and holds the nut 9 at the protruding portion.

A compression coil spring 27 is fitted between the sliding member 15 and an inner bottom face of the guide hole 6, and tension thereof acts on the sliding member 15. An opening 28, having a circular shape, for receiving the compression coil spring 27 is formed below the sliding member 15. Reference numeral 29 denotes an insulation sheet fitted into the inner bottom face of the guide hole 6. Instead of the tension of the compression coil spring 27, the air pressure introduced from the vent hole 13 can also be used.

Next, the on-off valve structure portion will be described.

An on-off valve structure portion 43 performs flowing of the cooling air introduced from the vent hole 13 to the void 26 or blocking of the flow to the void 26, that is, performs an on-off valve function. In the on-off valve structure portion 43, an end face 45 of the sliding member 15 comes into close contact with an inner end face 44 of the guide hole 6 to block the cooling air flow, or the end face 45 is separated from the inner end face 44 to flow the cooling air. In order to reliably bring the both faces 44 and 45 into close contact with each other and maintain airtightness in this manner, the both faces 44 and 45 exist on an imaginary plane with which the central axial line O-O perpendicularly intersects.

The upper end face of the sliding member 15 constitutes the close contact face (the end face 45) on the sliding member 15 side, and the close contact face exists on the imaginary plane with which the central axial line O-O perpendicularly intersects as described above.

The both faces 44 and 45 are brought into close contact with each other by the tension of the compression coil spring 27, and in the close contact state, a void L is provided between the welding projection 46 and the steel plate part 3.

When the guide pin 16 is pushed down while the compression coil spring 27 is compressed by the advancement of the movable electrode 24, the on-off valve structure portion 43 is opened to form a void for air circulation. At the same time, the welding projection 46 is pressed against the steel plate part 3, and a welding current is applied. By pushing down the guide pin 16 as described above, the cooling air sent from the vent hole 13 flows through the guide hole 6, the air passage 22, the opened on-off valve structure portion 43, the void 26, and the pilot hole 7 to circulate, so that the welded portion of the nut 9 is cooled and entry of spatters is prevented.

Next, the thicknesses of the inserted portion and the extended portion will be described.

As illustrated in FIG. 6, a thickness T1 of the inserted portion 17 as viewed in the diameter direction of the electrode is set to a value at which the coupling rigidity between the guide pin 16 and the sliding member 15 can be appropriately maintained. The thickness T1 is too thick from the viewpoint of thermal expansion, but is set to be thick mainly for appropriately maintaining the coupling rigidity between the guide pin 16 and the sliding member 15. As will be described later, for this reason, the amount of thermal expansion of the inserted portion 17 increases, and the wear amount also increases.

A thickness T2 of the extended portion 18 is set with the intention of reducing the strength of the force acting in the diameter direction during thermal expansion, and is set to be thinner than the thickness T1 of the inserted portion 17. As is apparent from FIG. 7, by forming the flat portion 23, the air passage 22 is formed between the flat portion 23 and the inner face of the guide hole 6, and a thin-wall deformable portion 30 is formed in the extended portion 18.

When the extended portion 18 is heated, expansion force in the circumferential direction of a non-thin-wall deformable portion 31 in which the thin-wall deformable portion 30 is not formed is generated in the non-thin-wall deformable portion 31 as indicated by arrow 33. The arc-shaped expansion force indicated by arrow 33 acts on both sides of the thin-wall deformable portion 30, and the surface of the thin-wall deformable portion 30, that is, the flat portion 23 bulges toward the inside of the air passage 22. Due to such bulging, the force with which the extended portion 18 presses the inner face of the guide hole 6 is reduced. Therefore, the pressing force acting on the inner face of the guide hole 6 in the extended portion 18 during thermal expansion is smaller than the pressing force acting on the inner face of the guide hole 6 in the inserted portion 17 during thermal expansion.

Therefore, the sliding wear amount in the extended portion 18 is significantly reduced as compared with the sliding wear amount in the inserted portion 17. A shape in which the surface of the thin-wall deformable portion 30 bulges and protrudes is indicated by an expansion line 34 depicted by a two-dot chain line. The gentle and substantially cylindrical expansion indicated by the expansion line 34 is continuous in the central axial line O-O direction.

When the extended portion 18 expands, force acting in the diameter direction in the non-thin-wall deformable portion 31 acts on the inner face of the guide hole 6 as indicated by arrow 35. Such a force component indicated by arrow 35 is converted into expansion force (arrow 33) in the circumferential direction of the non-thin-wall deformable portion 31 in which the thin-wall deformable portion 30 is not formed. The force in the circumferential direction indicated by arrow 33 acts on both sides of the thin-wall deformable portion 30 from the non-thin-wall deformable portion 31, and the deformation in which the surface of the thin-wall deformable portion 30 (the flat portion 23) protrudes toward the space of the air passage 22 in a bulging state is performed. That is, the flat portion 23 is deformed into the shape as indicated by the expansion line 34. The force pressing the extended portion 18 against the inner face of the guide hole 6 by the thermal expansion is converted or distributed due to the bulging deformation of the thin-wall deformable portion 30 toward the air passage 22, and thus is significantly smaller than that of the inserted portion 17.

Figure 9:
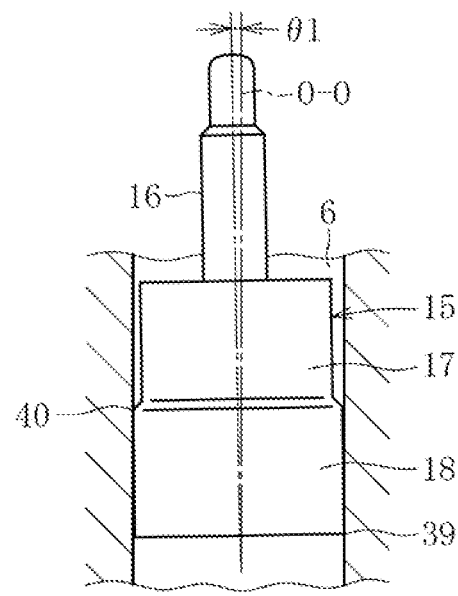
FIG. 9 is a simplified side view illustrating an inclination angle of the guide pin.

Since the pressurization is repeated by the movable electrode 24, the sliding wear progresses over the entire length of the sliding member 15 while the sliding member 15 is in mint condition. However, since the amount of expansion is small in the extended portion 18, the progress of the sliding wear becomes stopped at an early stage when the number of sliding times is small. However, since the inserted portion 17 has a large wall thickness and a large amount of expansion as denoted by reference numeral 37 in FIG. 6, the progress of the sliding wear continues even when the number of sliding times caused by the movable electrode 24 increases. That is, since the inserted portion 17 has a wall thickness larger than that of the extended portion 18, the period of pressing the inner face of the guide hole 6 is prolonged, the progress of the sliding wear continues for a long period of time, and the wear amount of the inserted portion 17 is much larger than that of the extended portion 18. In such a state, when the temperature of the sliding member 15 returns to ordinary temperature due to stopping of the welding operation or the number of times of welding decreases, the sliding member 15 contracts due to temperature decreases. Further, as illustrated in FIG. 9, the diameter of the inserted portion 17 becomes smaller than the diameter of the extended portion 18.

Since such pressing force applied to the inner face of the guide hole 6 appears large at the inserted portion 17 and small at the extended portion 18, the sliding wear amount of the extended portion 18 is much smaller than the sliding wear amount of the inserted portion 17.

Furthermore, as illustrated in FIG. 6, when the extended portion 18 expands, an inward expansion portion 36 is formed inside the extended portion 18 as indicated by two-dot chain lines. The inward expansion portion 36 gradually increases toward the end of the extended portion 18. Since the wall thickness of the extended portion 18 is set to be thinner than that of the inserted portion 17, such inward expansion is caused, so that the pressing force of the extended portion 18 acting on the inner face of the guide hole 6 is further reduced. Note that the inward expansion portion 36 is exaggerated for ease of understanding.

Next, the inclination of the guide pin will be described.

As indicated by two-dot chain lines in FIG. 6, the sliding wear amount of an expansion portion 37 of the inserted portion 17 is increased due to a large amount of expansion of the expansion portion 37. On the other hand, the sliding wear amount of the extended portion 18 is small as being hardly visible due to the small amount of expansion of the extended portion 18. FIG. 9 illustrates a state of external shapes of the inserted portion 17 and the extended portion 18 at the time when the sliding member 15 contracts due to shifting to ordinary temperature caused by stopping the operation or due to temperature reduction caused by a decrease in the number of times of welding. The gap between the extended portion 18 and the inner face of the guide hole 6 is substantially zero, and the extended portion 18 slides on the inner face of the guide hole 6 with no gap. Therefore, an inclination angle θ1 of the guide pin 16 with respect to the central axial line O-O is very small.

The one-side lower end of the extended portion 18 is in point contact with the inner face of the guide hole 6 at a contact point 39, and the other-side upper end of the extended portion 18 is in point contact with the inner face of the guide hole 6 at a contact point 40. At this time, there is a void between the upper end of the inserted portion 17 and the guide hole 6, and the upper end of the inserted portion 17 is not in contact with the inner face of the guide hole 6.

On the other hand, as described above, in other words, as in the configuration described in Patent Literature 1, the thickness of the sliding member 15 is uniformly maintained over the entire length of the sliding member 15. Thus, when the sliding member 15 is heated and expanded, the amount of expansion of the sliding member 15 increases, so that the sliding member 15 is strongly pressed against over the entire length of the inner face of the guide hole 6 of the electrode main body 1. When the sliding member 15 is forcibly slid under such increased amount of expansion, the sliding wear amount increases. Thereafter, when the sliding member 15 returns to ordinary temperature or the temperature of the sliding member decreases due to a decrease in the number of times of welding, the gap between the sliding member 15 and the guide hole 6 becomes excessive.

Figure 10:
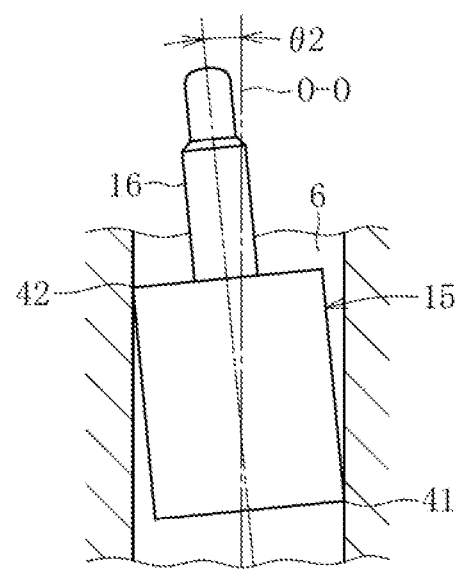
FIG. 10 is a simplified side view illustrating an inclination angle of the guide pin.

Since the gap becomes excessive over the entire region of the sliding member 15, the inclination of the sliding member 15 and the guide pin 16 with respect to the central axial line O-O of the electrode appears large. Reference numeral 41 denotes a lower contact point with respect to the inner face of the guide hole 6, and reference numeral 42 denotes an upper contact point with respect to the inner face of the guide hole 6. This inclination angle is denoted by θ2 in FIG. 10. Therefore, the guide pin 16 strongly comes into contact with the pilot hole 7 of the steel plate part 3, and a large deviation occurs in the relative position between the steel plate part 3 and the electrode main body 1, which is disadvantageous for improving the welding accuracy.

Next, a modification will be described.

Figure 8:
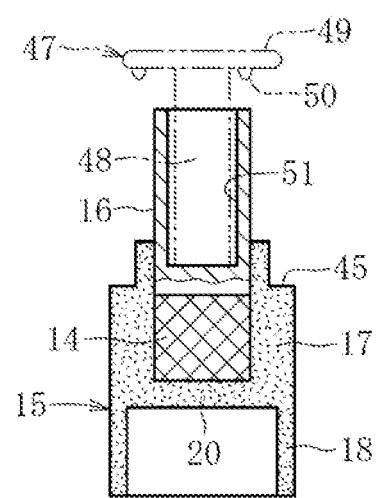
FIG. 8 is a sectional view illustrating another guide member.

In the modification illustrated in FIG. 8, the guide pin 16 adapts to a projection bolt 47. The projection bolt 47 includes a stem 48 which is externally threaded, a flange 49 that has a circular shape and is integrally formed with the stem 48, and a welding projection 50 which is formed on a lower face of the flange 49. The guide pin 16 has a hollow pin shape in which a receiving hole 51 is formed in order to insert the stem 48. In the following description, the projection bolt may be simply referred to as a bolt. Other configurations are identical to those in the previous case including portions not illustrated, and members having similar functions are denoted by the same reference numerals. The thermal expansion, sliding wear, and the like of the sliding member 15 are also identical to those in the previous case.

The operation and effects of the embodiment described above are as follows.

Melting heat generated during welding of the nut 9 or the bolt 47 to the steel plate part 3 by electrical resistance welding is transferred from the steel plate part 3 to the sliding member 15 through the electrode main body 1. At the same time, this melting heat is transferred from the guide pin 16 to the sliding member 15. The heat transfer state to the sliding member 15 extends from the inserted portion 17 into which the guide pin 16 is inserted to the extended portion 18 that has a cylindrical shape and is continuous with the inserted portion 17. In the temperature distribution viewed in the central axial line O-O direction of the electrode, the temperature is higher in the inserted portion 17 than in the extended portion 18 because the inserted portion 17 is close to the molten portion.

Since the guide pin 16 exists on the center side in the inserted portion 17, force in the diameter direction in the inserted portion 17 during thermal expansion strongly acts on the inner face of the guide hole 6. Furthermore, since the effect of the expansion of the guide pin 16 itself is added, the pressing force acting on the inner face of the guide hole 6 increases. Further, the inserted portion 17 receives heat also from the guide pin 16.

Due to the heating phenomenon as described above, the difference in temperature between at the time of use of the electrode and at the time of non-use of the electrode increases in the inserted portion 17, and the amount of expansion or contraction of the inserted portion 17 also increases. The wear amount of the inserted portion 17 in such an environment is large.

The extended portion 18 has a cylindrical shape, and the inside thereof is a space. In addition, since there is the heat insulating portion 20 that is formed at a boundary portion between the inserted portion 17 and the extended portion 18 and with which the end face 19 of the guide pin 16 is in close contact, the amount of heat transferred to the extended portion 18 is smaller than the amount of heat transferred to the inserted portion 17.

In the present embodiment, the thickness T2 of the extended portion 18 as viewed in the diameter direction of the guide pin 16 is molded to be thinner than the thickness T1 of the inserted portion 17. In addition to the thin extended portion 18 in such a manner, the flat portion 23 for the air passage 22 is provided in the sliding member 15, and the thin-wall deformable portion 30 thinner than the extended portion 18 is formed. Therefore, when the extended portion 18 is heated, the expansion force in the circumferential direction of the non-thin-wall deformable portion 31 in which the thin-wall deformable portion 30 is not formed acts from both sides of the thin-wall deformable portion 30, and the surface 23 of the thin-wall deformable portion 30 bulges toward the inside of the air passage 22. As a result, the pressing force acting on the inner face of the guide hole 6 in the extended portion 18 during thermal expansion is smaller than the pressing force acting on the inner face of the guide hole 6 in the inserted portion 17 during thermal expansion. Therefore, the sliding wear amount in the extended portion 18 is significantly smaller than the sliding wear amount in the inserted portion 17.

When the extended portion 18 expands, force 35 acting in the diameter direction in the non-thin-wall deformable portion 31 acts on the inner face of the guide hole 6. Such a force component 35 is converted into an expansion force in the circumferential direction of the non-thin-wall deformable portion 31. The expansion force in the circumferential direction of the non-thin-wall deformable portion 31 acts from both sides of the thin-wall deformable portion 30, whereby the surface 23 of the thin-wall deformable portion 30 deforms in the state where the surface of the thin-wall deformable portion bulges toward the space of the air passage 22. The force 35 pressing the extended portion 18 against the inner face of the guide hole 6 by the thermal expansion is distributed due to the bulging deformation of the thin-wall deformable portion 30 toward the air passage 22, and thus is significantly smaller than that of the inserted portion 17.

From the phenomenon described above, even if the wear progresses in the inserted portion 17, the wear amount in the extended portion 18 is very small, or substantially zero. Even if the sliding member 15 contracts resulting from returning of the sliding member 15 to ordinary temperature due to operation shutdown or from lowering of the temperature due to reduction of the number of times of welding, the gap between the inserted portion 17 and the guide hole 6 is large, but the gap between the extended portion 18 and the guide hole 6 is very small or substantially absent.

Therefore, wear over the entire region of the sliding member 15 is prevented from proceeding, normal sliding in the extended portion 18 is maintained, and abnormally large inclination of the guide pin 16 is prevented. That is, such an inexpediency in the configuration described in Patent Literature 1 that the entire region of the sliding member 15 is significantly worn to an abnormal degree and a large gap is formed between the entire sliding member 15 and the guide hole 6 at ordinary temperature or when the number of times of welding is prevented, so that the sliding member 15 and the guide pin 16 can be prevented from being inclined greatly. Since the normal sliding in the extended portion 18 is maintained as described above, the inclination of the sliding member 15 and the guide pin 16 decreases. In this way, the positional deviation of the guide pin 16 in the inclination direction is reduced. Thus, the deviation of the relative position between the guide pin 16 and the steel plate part 3 falls within the allowable range, which is effective for improving the welding quality.

As described above, the amount of thermal expansion and contraction of the inserted portion 17 appears large. However, since the synthetic resin material bites into the finely projected and recessed portion 14, the integrity of the guide pin 16 and the synthetic resin material in the inserted portion 17 can be reliably maintained.

INDUSTRIAL APPLICABILITY

As described above, according to the present invention, in the electrical resistance welding electrode in which a guide pin and a sliding member are integrated by injection molding, an inclination angle of the guide pin is reduced by forming a thin portion in the sliding member to reduce a wear amount of the thin portion. Therefore, an electrical resistance welding electrode having good operation reliability can be obtained regardless of thermal expansion, and the electrical resistance welding electrode can be used in a wide industrial field such as welding processes of automotive vehicle body and of sheet metal of household electrical appliances.

REFERENCE SIGNS LIST

1 Electrode main body
3 Steel plate part
6 Guide hole
9 Projection nut
14 Projected and recessed portion
15 Sliding member
16 Guide pin
17 Inserted portion
18 Extended portion
19 End face
20 Heat insulating portion
22 Air passage
23 Flat portion
26 Void
30 Thin-wall deformable portion
31 Non-thin-wall deformable portion
34 Expansion line
36 Inward expansion portion
37 Expansion portion
47 Projection bolt
O-O Central axial line
θ1 Inclination angle of guide pin
θ2 Inclination angle of guide pin
T1 Thickness of inserted portion
T2 Thickness of extended portion

The invention claimed is:

1. An electrical resistance welding electrode comprising:
a guide pin having a circular section, protruding from an end face of a main body of the electrical resistance welding electrode, and passing through a pilot hole of a steel plate part, the guide pin being made of a heat-resistant hard material such as a metal material or a ceramic material;
a sliding member having a circular section and slidably fitted in a guide hole of the main body of the electrical resistance welding electrode, the sliding member being made of an insulating synthetic resin material, wherein
the guide pin and the sliding member are integrated with each other by insert molding during injection molding of the sliding member,
the sliding member includes an inserted portion into which the guide pin is inserted, an extended portion that has a cylindrical shape and is continuous with the inserted portion, and a heat insulating portion that is formed at a boundary portion between the inserted portion and the extended portion and with which an end face of the guide pin is in close contact,
a finely projected and recessed portion is formed on a surface of the guide pin to be inserted into the sliding member,
a thickness of the extended portion as viewed in a diameter direction of the guide pin is set to be thinner than a thickness of the inserted portion,
an air passage of cooling air flowing into the guide hole from a vent hole of the main body of the electrical resistance welding electrode is configured by forming a flat portion on an outer peripheral face of the sliding member,
a thin-wall deformable portion is formed in the extended portion by forming the air passage of the cooling air, and wherein
a sliding wear amount in the extended portion smaller than a sliding wear amount in the inserted portion is ensured by configuring such that, when the extended portion is heated, a surface of the thin-walled deformation portion bulges toward an inside of the air passage due to an expansion force in a circumferential direction of a non-thin-wall deformable portion in which the thin-wall deformable portion is not formed, acting on both sides of the thin-wall deformable portion, thereby setting a pressing force on an inner face of the guide hole in the extended portion during thermal expansion to be smaller than a pressing force on the inner face of the guide hole in the inserted portion during thermal expansion.

* * * * *